(12) United States Patent
Peterson (10) Patent No.: US 6,187,470 B1
(45) Date of Patent: Feb. 13, 2001

(54) SOLDERLESS BATTERY CELL HOLDER

(76) Inventor: Roland K. Peterson, 14550 20th Ave. NE., Seattle, WA (US) 98155

(*) Notice: Under 35 U.S.C. 154(b), the term of this patent shall be extended for 0 days.

(21) Appl. No.: 09/095,776

(22) Filed: Jun. 10, 1998

Related U.S. Application Data (60) Provisional application No. 60/049,413, filed on Jun. 10, 1997.

(51) Int. Cl.[7] .................................................... H01M 2/10
(52) U.S. Cl. ............................ 429/99; 429/100; 429/157; 429/159
(58) Field of Search .............................. 429/99, 100, 159, 429/157

(56) References Cited

U.S. PATENT DOCUMENTS

| | | |
|---|---|---|
| 1,592,678 | 7/1926 | Tannert . |
| 3,000,999 | 9/1961 | Schlau ................................. 136/173 |
| 3,941,618 | 3/1976 | Mabuchi ............................. 136/173 |
| 4,205,121 | 5/1980 | Naitoh ................................... 429/99 |
| 4,464,445 | 8/1984 | Matti ..................................... 429/99 |
| 4,554,221 | 11/1985 | Schmid .................................. 429/1 |
| 4,576,880 | 3/1986 | Verdier et al. ....................... 429/99 |
| 4,965,148 | * 10/1990 | Daio et al. ........................... 429/159 |
| 5,104,754 | 4/1992 | Dorinski et al. ..................... 429/99 |
| 5,180,644 | 1/1993 | Bresin et al. ......................... 429/98 |
| 5,191,275 | 3/1993 | Singhal ................................. 320/2 |
| 5,250,371 | 10/1993 | Kleinert, III et al. ................ 429/99 |
| 5,296,314 | * 3/1994 | Millauer et al. ...................... 429/99 |
| 5,326,651 | 7/1994 | Mehta et al. ......................... 429/96 |
| 5,489,486 | 2/1996 | Glover ................................. 429/100 |
| 5,709,963 | * 1/1998 | Sim ................................ 429/159 X |

OTHER PUBLICATIONS

Article, Model Electronic Corp. "Solderless Power Tube", by Jim Petro, S & E Modeler Sailplane & Electric, Oct./Nov., 1998, vol. 3, No. 6, pp. 4–6.

* cited by examiner

*Primary Examiner*—John S. Maples
(74) *Attorney, Agent, or Firm*—R. Reams Goodloe, Jr.

(57) ABSTRACT

A solderless battery pack. The pack has a generally thin wall cell body portion with two tubular segments each adapted to hold a plurality of batteries. An upper end cap and a lower end cap are provided for fitting tightly over the upper and lower ends of the cell body portion, respectively. The end caps are compressingly engaged to make electrical connection with the terminals of the uppermost and the lowermost batteries by use of opposing all-thread fasteners. The all thread fasteners each extend through the upper and lower end caps and and along side of the cell body portion in a spaced apart relationship. The all thread fasteners are removably affixed by nuts below and above the end caps. In this manner, batteries are provided a complete electrical circuit without current draining soldered or welded contacts.

17 Claims, 7 Drawing Sheets

SOLDERLESS BATTERY CELL HOLDER

The priority of this application is based on prior pending U.S. Provisional Patent Application Ser. No. 60/049,413, filed Jun. 10, 1997, the disclosure of which is incorporated herein by this reference.

TECHNICAL FIELD OF THE INVENTION

This invention relates to novel battery holders, especially for holding a plurality of battery cells, and to methods of using the same, particularly for small electric powered vehicles such as model trucks and model aircraft.

BACKGROUND OF THE INVENTION

In the use of batteries to power electrical toys and tools, such as small electrically powered model airplanes, or for other purposes, it is often desirable to gang seven to ten rechargeable cells together to provide the desired amount of power. At this time, it is popular to use rechargeable cells of about 1.2 volts each, arranged in groups ranging from about 4 cells to about 12 cells per battery pack. At present, for use in model cars, the use of 6 cells per battery pack is preferred. In small aircraft, the use of 8 to 10 cells per battery pack is presently preferred.

In spite of the various schemes which have so far been offered to the marketplace for holding multiple batteries together in a pack, a continuing and growing demand exists for a simple, inexpensive method which can be used to maximize battery output, to preserve and enhance the reliability of the batteries in the pack, and to enhance the service life of batteries between recharge cycles. A particular problem often seen in various prior art battery holders is the presence of spot welded or soldered junctions which are somewhat resistant to electrical conduction, resulting in heating of the junction, sometimes to unacceptably high levels, and in any event needlessly dissipating power.

As will be evident to those familiar with model cars, trucks, and aircraft, and to whom this specification is particularly addressed, a battery holder which effectively eliminates the loss of energy in soldered, welded, or other inefficient joints would be of great benefit in increasing the operating life of such types of apparatus, when compared with battery holders which are currently in widespread use. Moreover, a battery pack which increases the output power and/or battery discharge cycle time to the apparatus using the battery pack is always a welcome addition to the model competitor's arsenal.

OBJECTS, ADVANTAGES, AND FEATURES OF THE INVENTION

From the foregoing, it will be apparent to the reader that one important and primary object of the present invention resides in the provision of a novel battery pack for ganging together a plurality of cells in a manner that maximizes the efficiency of extracting power from the battery cells in the pack.

Another important objective of the invention is to eliminate battery power loss due to resistive heating in spot welds or soldered joints, by providing a battery pack which avoids using such means for forming electrical connections.

Yet another object of the invention is to provide a battery pack with a phantom battery cell, to enable a battery pack to provide power output from an uneven number of battery cells.

Other important but more specific objects of the invention reside in the provision of novel battery packs which:

are highly efficient in supplying electrical power from rechargeable battery cells;

can easily withstand repeated opening and closing cycles for replacement of discharged or weak battery cells in the battery pack;

are, in one embodiment, available in a configuration that allows the testing and/or recharge of individual battery cells;

provide various marking indicia to allow easy verification of the correct individual battery cell orientation, to assist the user in avoiding incorrect polarity during battery cell loading into a battery pack;

are preferably configured with non-identical tightening stays to help assure that correct polarity orientation is achieved when securing battery cells in the pack;

are easily worked on to achieve quick installation or removal of battery cells.

Other important objects, features, and additional advantages of our invention will become apparent to the reader from the foregoing and from the appended claims, and as the ensuing detailed description and discussion proceeds in conjunction with the accompanying drawing.

DESCRIPTION

I have now invented, and disclose herein, a novel, improved battery pack for holding battery cells. I have also developed a method for changing battery cells in such battery packs. Importantly, I have developed a method for operating electrically powered vehicles, especially model aircraft and automobiles, with my novel battery packs.

Figure 1:
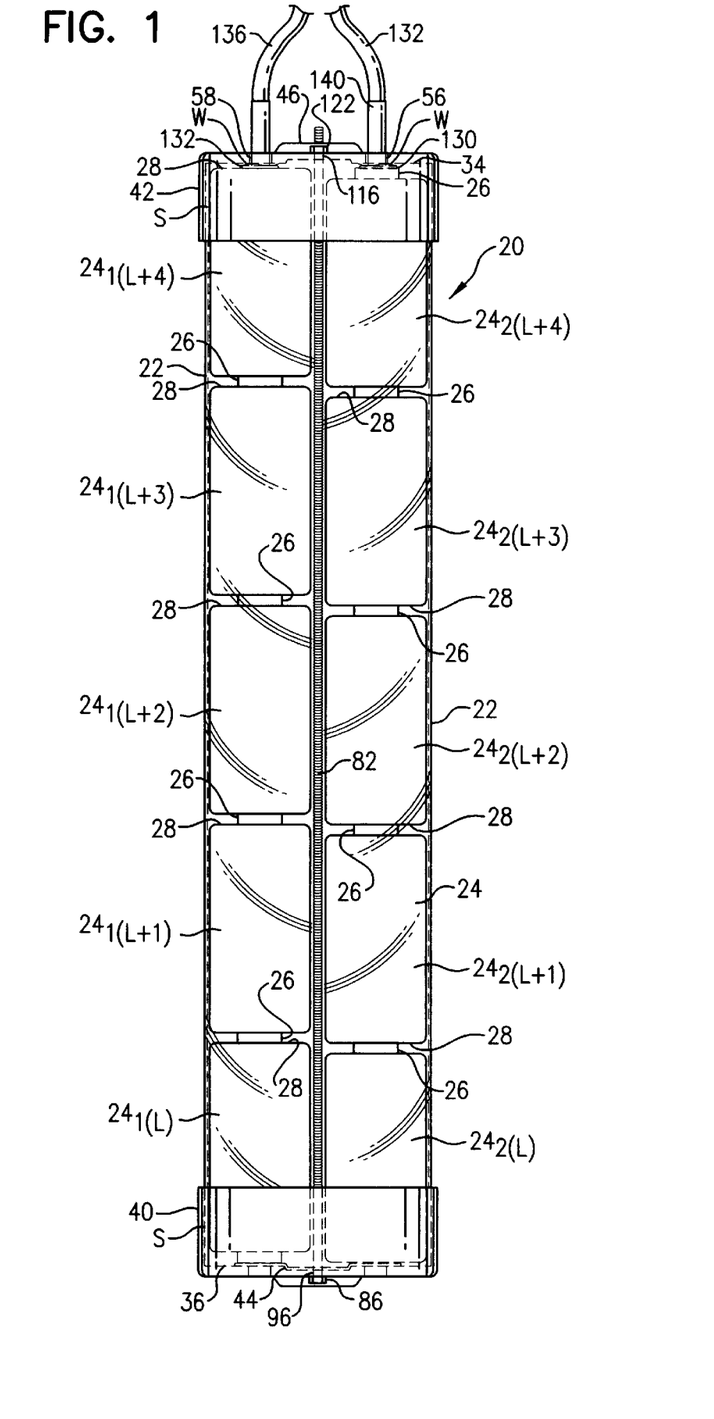
FIG. 1 is a front elevation view of a battery pack, with a transparent cell holder sleeve body, end caps, and contacts, shown holding ten battery cells.

As seen in the embodiment depicted in FIG. 1, my battery packs 20 have in the central portion thereof an elongated cell holder sleeve (or body) 22. This cell holder sleeve 22 is preferably provided in a thin-wall and "see-through" material (e.g., 1/32" thick wall that allows the user to see through the cell holder sleeve 22 to check the polarity orientation of each of the battery cells 24 that are confined and contained by the cell holder sleeve 22. More specifically, each of typical battery cells 24 has a positive terminal 26 and a negative terminal 28 at opposing ends of an elongate and usually cylindrical body portion 30, and it is important that the positive and negative terminals in adjacent battery cells be properly oriented to avoid creating an electrical short circuit at any pair of battery cells 24 in the battery pack 20.

Figure 2:
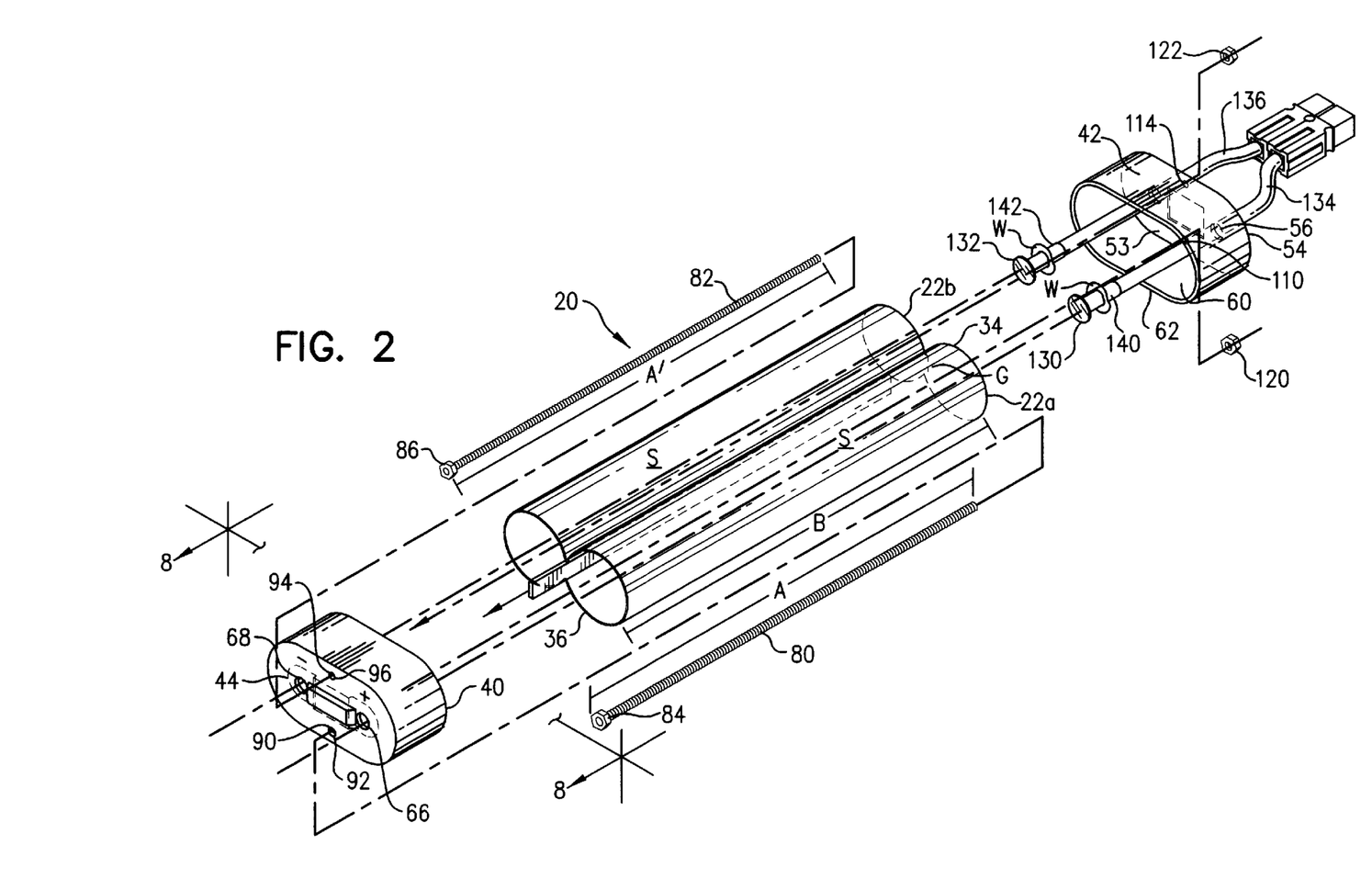
FIG. 2 is an exploded perspective view of the battery pack just illustrated in FIG. 1, now showing the top and bottom end caps, the cell holder sleeve body, an insulating insert strip running axially in the cell holder sleeve body to separate first and second rows of battery cells, and importantly, a first and a second stay with retaining nuts for securing the battery pack together.
Figures 3, 4, 5, 8, 9, 10, 11:
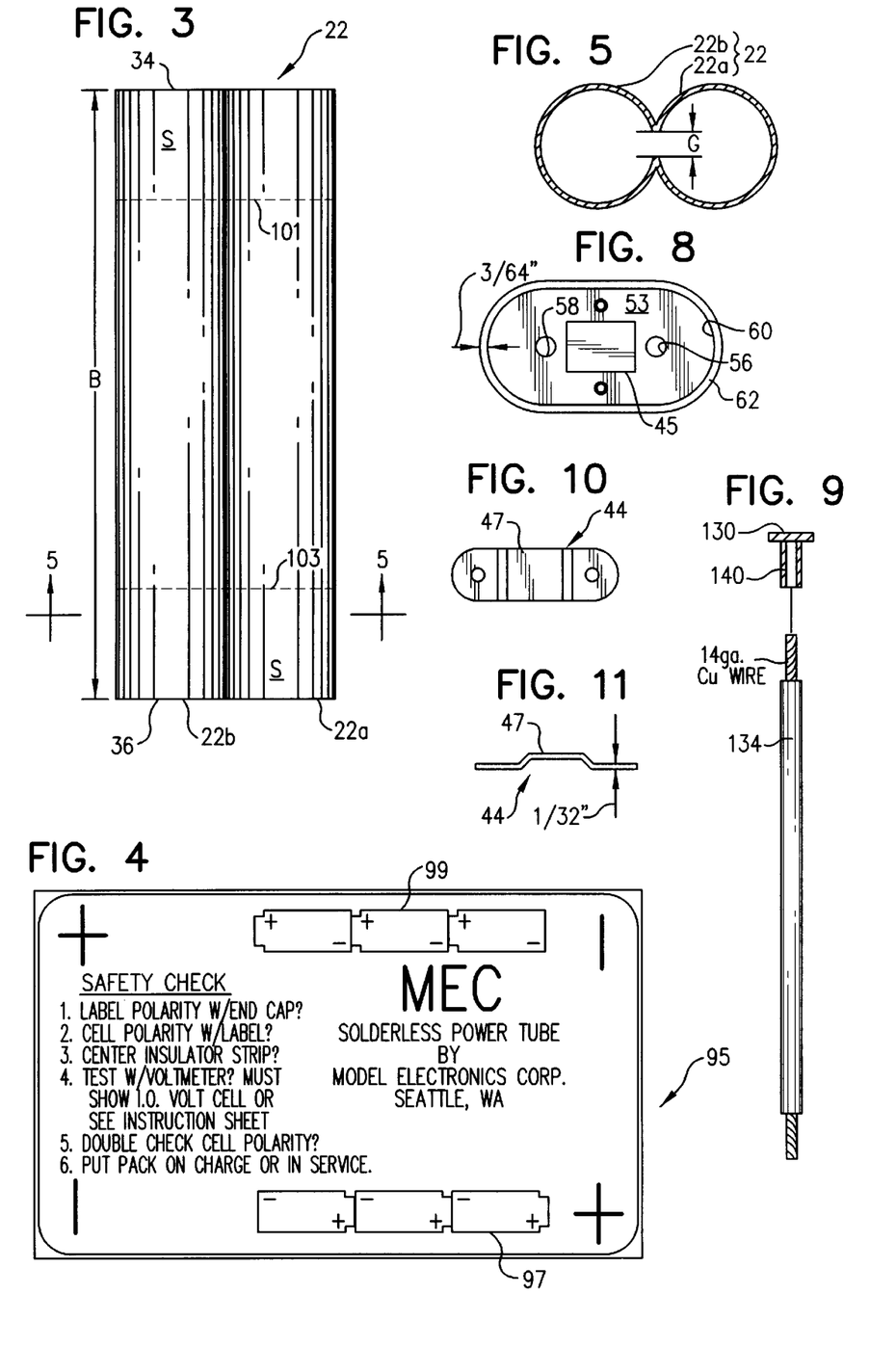
FIG. 3 is front elevation view of one embodiment of a transparent cell holder sleeve body portion of the battery pack.
FIG. 4 is a plan view of the reference indicia utilized to enable the user to properly orient battery cells in the battery pack; the reference indica are preferably applied externally by affixing a label near the middle of the transparent cell holder sleeve body, normally between the broken lines provided for label location as noted in FIG. 3.
FIG. 5 is a cross-sectional view of the cell holder sleeve body as just illustrated in FIG. 3 above, as taken across section 5—5 of FIG. 3.
FIG. 8 is a reflected plan view of the interior of the end cap just illustrated in FIG. 6 above, taken as if looking from line 8—8 of FIG. 2.
FIG. 9 is a full size schematic of and electrical lead line and the electrical contacts used, showing the preferred hollow copper contacts and the heavy flexible wire utilized.
FIG. 10 is a top plan view of the electrical connector bar used in the bottom end cap to connect the bottom battery in one battery cell holder sleeve with the bottom battery in an second battery cell holder sleeve.
FIG. 11 is a side elevation view of the electrical connector bar first illustrated in FIG. 10.
Figure 6:
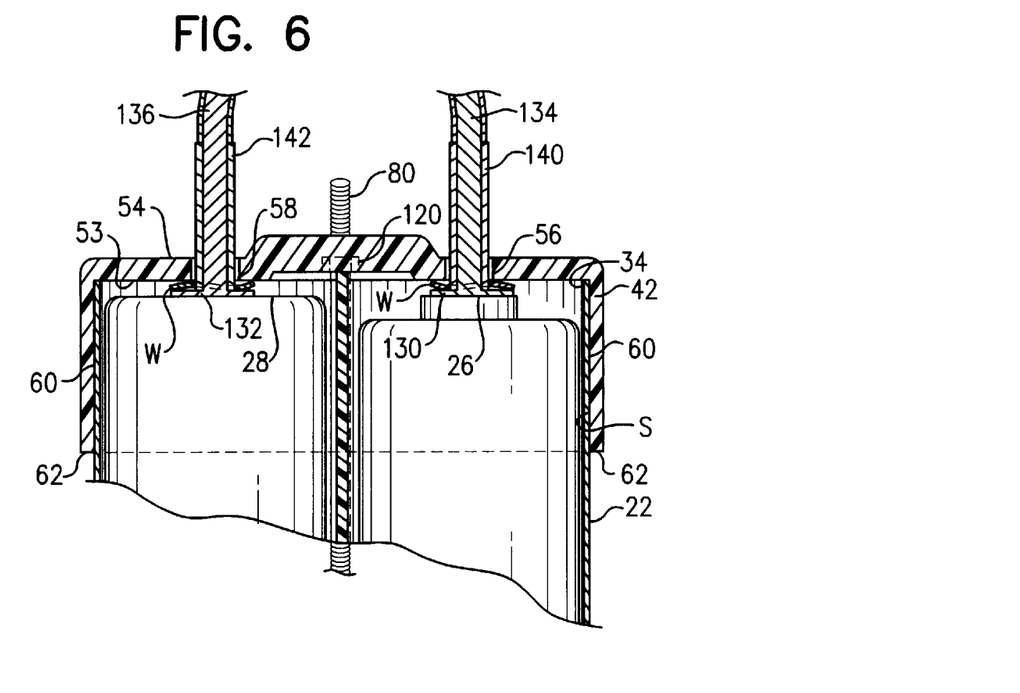
FIG. 6 is a cross-sectional view of a top end cap of my battery pack, showing the electrical connection to positive terminals of battery cells on one side and to negative terminals of battery cells on the other side.
Figure 7:
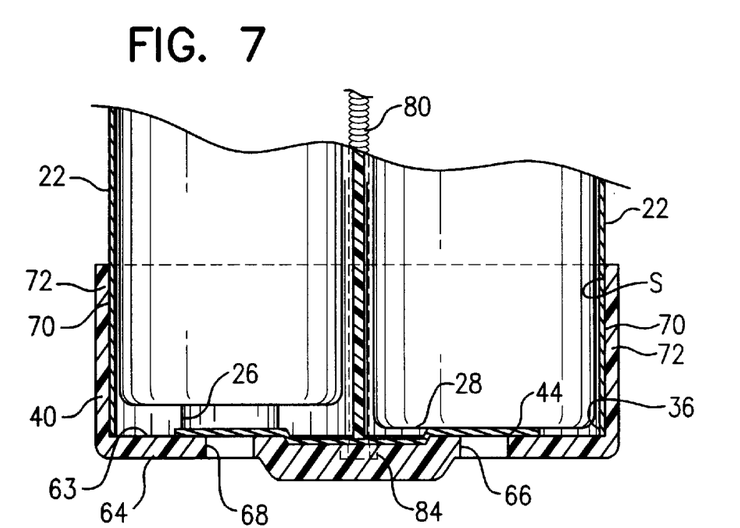
FIG. 7 is a cross-sectional view of a bottom end cap of my battery pack, showing the electrical connector bar used in the bottom end cap to connect a first battery stack with a second battery stack.

As better seen in FIGS. 2 and 5, the cell holding sleeve 22, when provided in a configuration to hold two columns of battery cells 24, is generally "figure-eight" in shape, substantially resembling two extended cylinders joined at their circumference and extended along a common axis in a nip-roll type configuration. In this configuration, a pair of side-by-side battery cell sleeve holding tubes $22_a$ and $22_b$, each adapted for close fitting engagement around and securely holding (at least transversely) a plurality of battery cells 24 in first and second battery cell columns is provided.

Ideally, a central dividing insulator strip 32 is provided at gap G (typically about 1/4 inch width when provided for sub-C type Ni-Cad batteries) located between the otherwise substantially cylindrical portions of the side-by-side battery cell holding sleeve tubes $22_a$ and $22_b$. At the first 34 and second 36 ends of the battery cell holder sleeve 22, a high strength bottom end cap 40 and a top end cap 42 are affixed, respectively. Inside the bottom end cap 40 is placed an elongate copper connector bar 44, for connecting the lowermost battery cell $24_{1(L)}$ in a first column with the lowermost battery cell $24_{2(L)}$ in a second column. In this manner, the first column of battery cells is a series of longitudinally co-axially oriented battery cells from lowermost cell $24_{1(L)}$ to uppermost cell $24_{1(L+N)}$, where an integer X of quantity N+1 (where N is a an integer equal to or greater than zero and representing the number of cells N above the lowermost cell in the column) equals the number of cells in the first column of battery cells. Similarly, a second column of battery cells is a series of longitudinally co-axially oriented battery cells from lower most cell $24_{2(L)}$ to upper most cell $24_{2(L+M)}$, where an integer Y of quantity M+1 (where M is a an integer equal to or greater than zero and representing the number of cells M above the lowermost cell in the column) equals the number of cells in the second column. Importantly, as further explained in connection with FIGS. 12, 13, and 14 below, when using my novel battery pack 20 and a phantom cell 50, the number of battery cells X in a first column does not have to equal the number of battery cells Y in a second column. In other words, an odd number of battery cells can be included in a battery pack to meet the unique needs of a particular service situation. Also, it should be understood that while I have shown and explained my battery pack by use of the most commonly encountered two column configuration for battery cells, it is to be understood that any convenient integral number C of columns, from a single column (where C=1) up to any desired quantity of battery cell columns, could be accomplished by use of the techniques taught and claimed herein, by simply changing the shape of the battery holder sleeve body 22 (and number of tubes provided in the sleeve to match the desired number of columns), the shape of the bottom end cap 40 and of the top end cap 42, as well as providing a the connector bar 44 in the appropriate electrical contacting configuration.

Referring now to FIGS. 1, 2, 6, and 7, it can be seen that top end cap 42 has an interior end wall portion 53, an exterior end wall portion 54, and first and second electrical lead line passageways defined by sidewalls 56 and 58. The interior wall 60 (, with wall thickness of 3/64") of peripheral wall flange 62 extends outward from interior end wall portion 53 to cover and confiningly contain, at least that portion of the outer sidewall S of battery cell holder sleeve 22 which is adjacent first end 34 of the battery holder sleeve 22. Similarly, bottom end cap 40 has an interior end wall portion 63, an exterior end wall portion 64, and, for minimization of parts requirements, may further include unused first and second electrical lead line passageways defined by sidewalls 66 and 68. In the bottom end cap 40, the interior wall 70 of peripheral wall flange 72 extends outward from interior end wall portion 63 to cover and confiningly contain at least that portion of the outer sidewall S of battery cell holder sleeve 22 which is adjacent the second end 36 of the battery holder sleeve 22. In other words, to minimize costs, the top 42 and bottom 40 end caps may be molded identically, and then a connector bar 44 may be added to be bottom end cap 40, in connector bar receiving indentation 45. Connector bar 44 has a centrally located pocket or land portion 47 sized and shaped complementary to the indentation 45, for secure engagement of the connector bar 45 in its operating location. Usually, I prefer a thin connector bar 44, such as about 1/32" in thickness.

To help the user assure that polarity of batteries is correctly maintained, the battery pack 20 preferably uses a first stay-bolt 80 and a second stay-bolt 82 which are not interchangeable, i.e., they are of different in configuration, so that they are not reversible. To assure this arrangement is achieved, one ideal configuration is to use stay-bolts of different diameter. I prefer to use a first stay-bolt 80 of "all-thread" configuration in a rather small diameter, such as a 4–40 size, and a different small diameter "all-thread" second stay-bolt 82, preferably in the 2–56 size. Each of first 80 and second 82 stay-bolts are provided in a length A and A' respectively which is suitable to accommodate the length B of the battery cell sleeve 22 used to contain battery cell columns of a pre-selected size (i.e., desired number of cells). Sometimes, it may be desirable that one of the nuts on each stay-bolt, normally the bottom nut 84 on the first stay-bolt 80, and the bottom nut 86 on the second stay-bolt 82, can be permanently secured, to their respective stay-bolts, to simplify removal and reattachment of the stay-bolts.

As can be seen from comparing FIGS. 1 and 2, all of an even number of battery cells in the battery pack 20 are securely compressed for tight fitting engagement of their respective positive and negative terminals, in a properly configured polarity fashion, by:

(a) inserting a first column of X battery cells 24 in a battery cell holder sleeve $22_a$, carefully and properly aligning the polarity to avoid a short circuit;

(b) inserting a second column of Y battery cells in a battery cell holder sleeve $22_b$, carefully and properly aligning the polarity to avoid a short circuit;

(c) inserting the insulator strip 32 between columns of cells, in order to prevent adjacent columns of battery cells from touching each other and possibly rubbing off insulation on the cells;

(d) inserting the first stay-bolt 80 through the first stay passage 90, defined by sidewall 92 in bottom end cap 40, (e) inserting second stay-bolt 82 through the second stay passage 94, defined by sidewall 96 in bottom end cap 40;

(f) inserting battery cell holder sleeve 22, containing sleeve tubes $22_a$ and $22_b$, into a confined relationship with interior 70 of the peripheral flanged wall 72 of the bottom end cap 40, carefully observing the polarity markings "−" and "+" on the bottom end cap 40, and insuring that such polarity markings "−" and "+" agree with the orientation of the battery cells in the cell holder sleeves $22_a$ and $22_b$;

(g) running first and second stay-bolts longitudinally along the main axis of battery cell holder sleeves $22_a$ and $22_b$, preferably adjacent but outside the outer surface S of the battery cell holder sleeves $22_a$ and $22_b$;

(h) inserting the first stay-bolt 80 through the first stay passage 110 defined by sidewall 112 in top end cap 42, carefully observing the polarity markings on the top end cap 42, and insuring that such polarity markings agree with the orientation of the battery cells in the cell holder sleeves $22_a$ and $22_b$, and that each of the first stay-bolt and second stay-bolt is inserted into the stay passageway of proper size;

(i) inserting the second stay-bolt 82 through the second stay passage 114, defined by sidewall 116 in top end cap 42;

(j) affixing top nut 120 to first stay-bolt and initially tightening the nut 120 finger tight;

(k) affixing top nut 122 to second stay-bolt 82 and initially tightening the nut 122 finger tight;

(l) tightening both top nut 120 and 122 in a balanced fashion to bring substantially uniform pressure to both the first stay-bolt side and the second staybolt side of both the top end cap 42 and the bottom end cap 40, so as to evenly and firmly apply compressive force on a cell-to-cell basis, and from the uppermost cell $24_{1(L+N)}$ in the first column, and the upper most cell $24_{2(L+M)}$ in the second column, to the respective positive electrical lead line contactor and negative electrical lead line contactor.

After the battery pack has been prepared, connectors $K_+$ and $K_-$ are used to connect the positive and negative lead lines (discussed below) to the apparatus being driven.

In FIG. 5, a cross-sectional view of the cell holder sleeve body 22 is shown, further illustrating the provision of multiple columns for sets of battery cells, while providing a thin-wall battery cell holder sleeve 22. As noted in FIG. 4, to assist the user in keeping polarity of batteries correct, I have found it useful to provide a label 95 with reference indicia 97 and 99 thereon (as well as "−" and "+" terminal markings) so that both end caps and the batteries can be properly assembled into a finished battery pack 20. The reference indica are preferably applied externally by affixing the label 95 near the middle of the transparent cell holder sleeve body 22, normally between the broken lines 101 and 103 provided for label location as noted in FIG. 3.

Battery cells 24 must be properly prepared prior to inserting the same into the battery cell holding sleeves 22 of my Solderless Power Tube (tm) battery pack 20. For example, Sanyo brand 2000 mah, Sub-C cells have two shrink wrappings, and the top layer must be removed in order that the positive and negative parts of the cells can touch each other when such cells are stacked into a column. For removing the top layer, the Sanyo brand cell should be held with the bottom or negative side up, and the top layer is slit and peeled from the cell. However, care must be taken to prevent damage to the second or bottom shrink wrap layer, as it is the only protection against a short circuit. On the other hand, Panasonic brand 1700 mah cells have only one shrink wrap layer, and require no preparation. After the wrapping is properly configured, then I recommend that the terminals on each battery cell be properly cleaned by rubbing both the positive and the negative terminals of each cell with "Scotch-Brite" (tm) brand scouring pads, made by 3-M Corporation of Minneapolis, Minn. Steel wool should not be used, as it may have deleterious effects, including the creation of short circuits. Also, if damaged insulation is found on any cells, it must be repaired before the cell is placed into the battery pack 20.

The Solderless Power Tube (tm) battery pack 20 allows high current flow, because the unique design provides the smallest possible number of connections, and the connections present are designed to carry high current with the smallest possible resistance. The battery cells 24 touch each other, under compression, in series in columns, with absolutely nothing in between adjacent cells in the same column. Also, the cross-over connection bar 44 between columns is preferably made of silver plated copper, and is designed to carry a high current load. The positive electrical contact 130 (affixed to the positive electrical lead 132) and the negative electrical contact 134 (affixed to the negative electrical lead 136) of the battery pack 20 are preferably made of copper, also. Also, the positive and negative lead lines 132 and 136, respectively, are preferably provided in 14 gauge insulated copper wire, over which a hollow cylindrical portion 140 and 142 of the positive 130 and negative contacts 134 are crimped. Further, a "wave washer" W is provided between each of the positive and negative contacts and the interior wall 53 of the top end cap 42, to keep the copper positive 130 and negative 132 contacts flat on their respective positive and negative contacts on cells $24_{1(L+N)}$ and $24_2$ $(L+M)$, to assure that the most efficient electrical connection possible is attained.

As described, the opposing top and bottom end caps and the thin walled battery cell sleeve are secured together in a single battery pack 20 assembly, with batteries within the cell holding sleeve body 20. Compression and security of the package is achieved by use of adjustably tightenable fasteners, preferably in the form of stays, such as the all thread bolts above described. Also, it is important to emphasize that ideally the all-thread bolts are each of different size, to aid in keeping the polarity of the batteries correct. As noted above, I prefer to use a 4–40 all-thread bolt on one side, and a 2–56 all thread bolt on the other side. Nuts of appropriate size are provided on either end of the all thread bolts, above the upper end and below the lower end, respectively, of the top and bottom end caps. The nuts are tightened until the cells in the pack are adequately compressed together and against the contacts provided. As described, no solder joints are used, and the battery power is efficiently provided to the apparatus using the battery pack.

For model cars, it is common to utilize six (6) cells in a battery pack. For model aircraft, it is more common to utilize ten (10) or twelve (12) cells. In the later case, amperage may range from ten (10) to eighty (80), depending upon the amount of instantaneous work being done by the electric motor.

Figure 19:
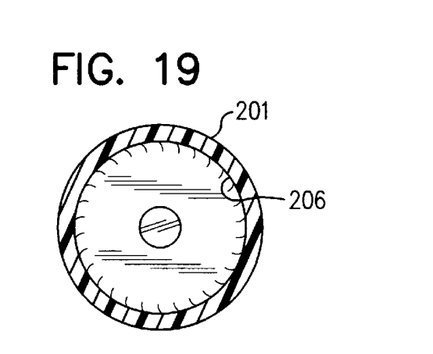
FIG. 19 is a reflected plan view, taken looking upward into the single cell battery holder first shown in FIG. 15 above.
Figure 20:
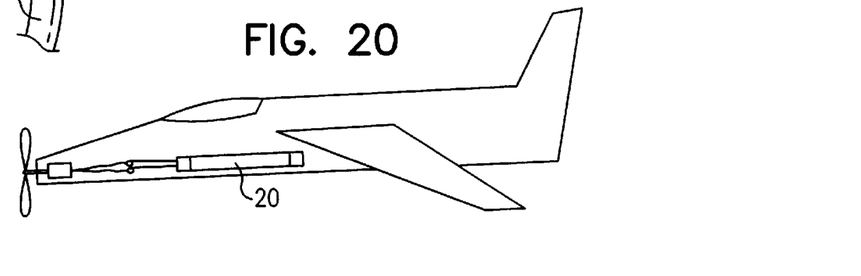
FIG. 20 illustrates an electric drive vehicle, here an electrically driven propeller airplane, driven by my novel battery pack.

When using Ni-Cad type batteries, it is common to have a requirement to test individual cells. This is easily accomplished with my single cell unit 200 shown in FIGS. 15, 16, and 19. In such units, and upper housing 201 and a lower housing 202 are shaped for complementary close fitting mating engagement, with a male flange 204 fitting inside the lip 206 in the upper housing 201, and slipping inside the upper housing 200 in close fitting fashion until stop 210 is encountered. When using cylindrical batteries, the upper 201 and lower 202 housings are shaped in complementary cylindrical fashion.

Figure 16:
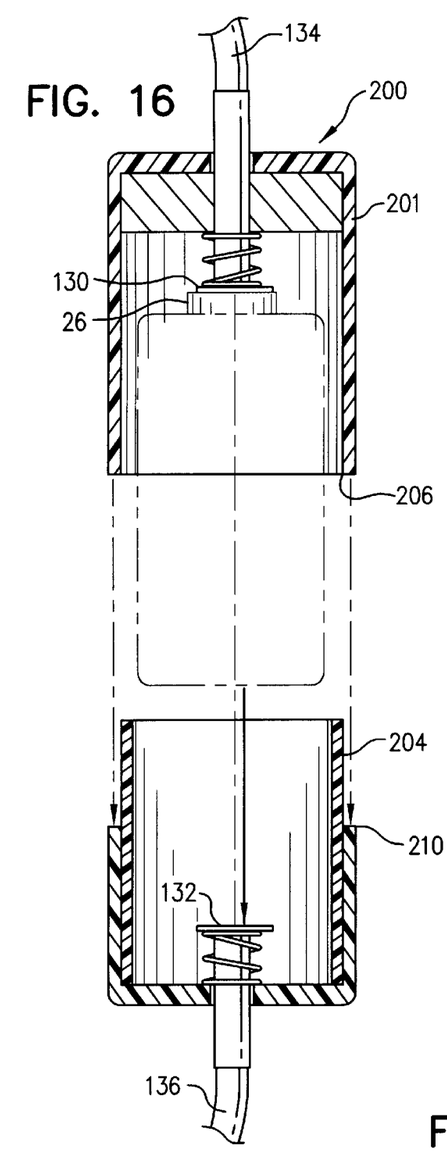
FIG. 16 is a vertical cross-sectional view, showing the single cell battery holder just illustrated in FIG. 15, but now showing a spacer for use in conjunction with testing smaller size battery cells than optimally fit in the battery holder lengthwise.
Figure 17:
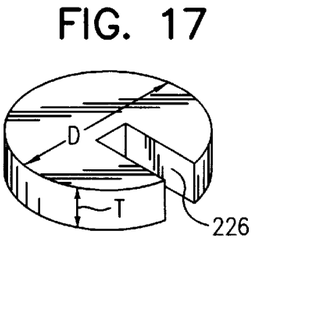
FIG. 17 is a perspective view of a spacer for use in conjunction with the single cell battery holder first shown in FIG. 16.
Figure 18:
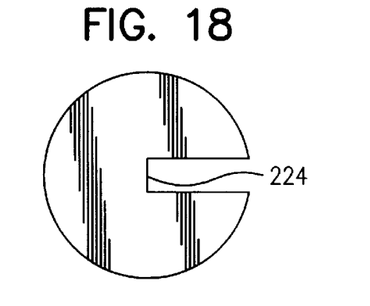
FIG. 18 is a top plan view of the spacer first shown in FIGS. 16 and 17.

Sometimes, testing of short batteries is desired, and in such cases, a spacer 220 is required, as depicted in FIGS. 16, 17, and 18. Ideally, spacer 200 is configured as a cylindrical disc of any desired diameter D and thickness T, and with an elongated slot 224 for passage of positive or negative leads therethrough, as defined by substantially rectangular type sidewalls 226.

Figure 12:
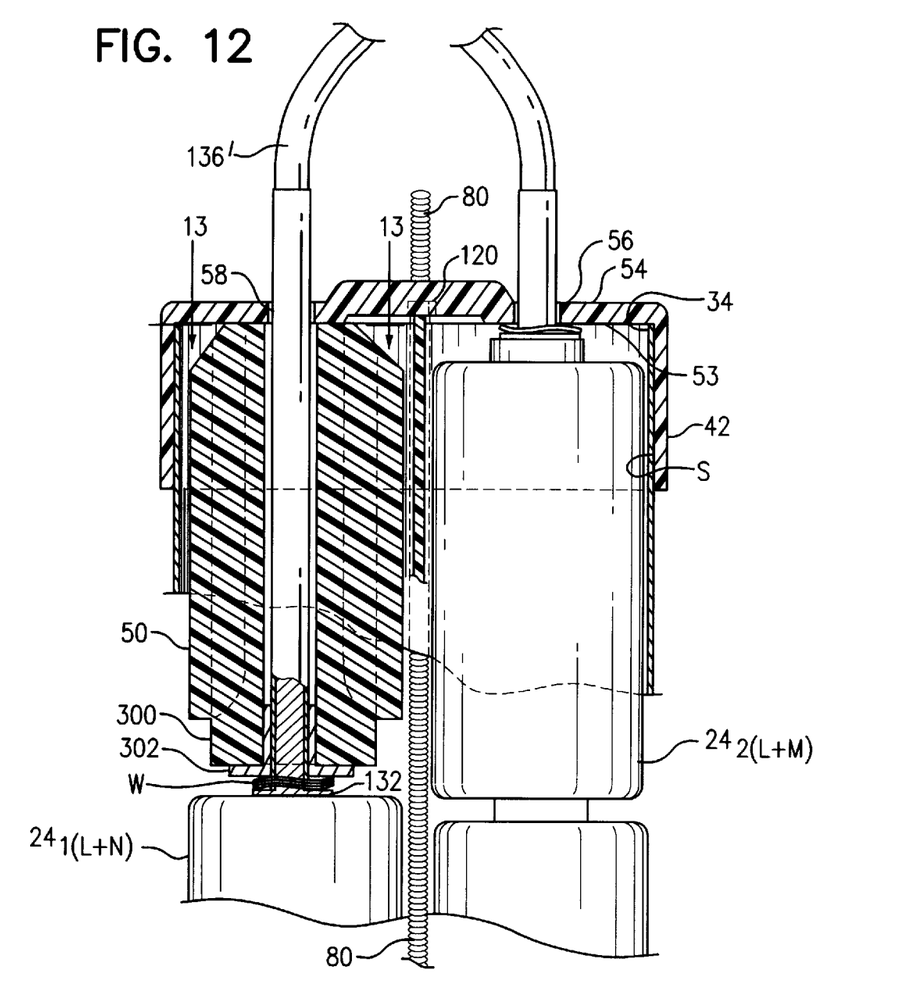
FIG. 12 is a side elevational view, with partial cutaway in the upper left to show, in cross-section, a phantom cell useful for battery pack operation with an odd number of battery cells.
Figure 13:
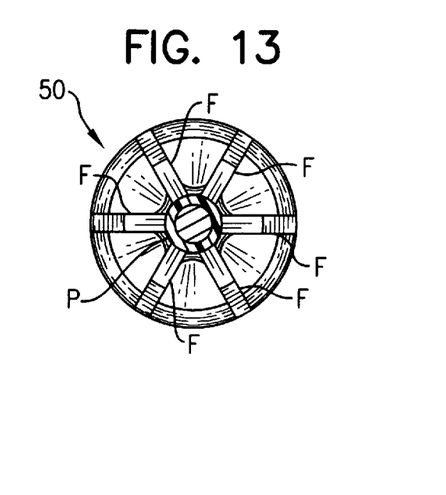
FIG. 13 is a top plan view of the phantom cell just illustrated in FIG. 12 above, showing the use of six flutes or ribs as provided in my preferred phantom cell arrangement.
Figures 14, 15:
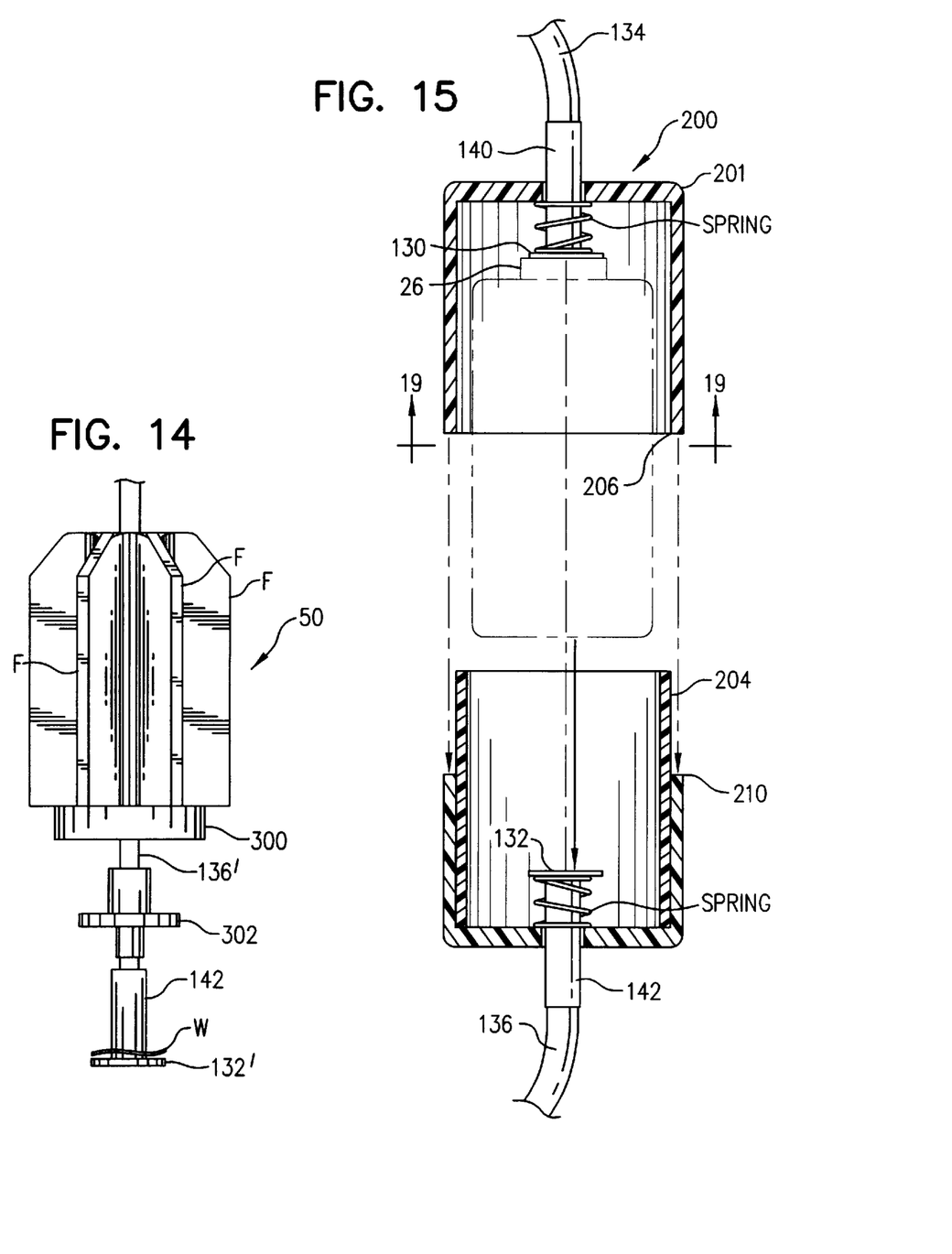
FIG. 14 is a side elevation view of the phantom cell illustrated in FIGS. 12 and 13, with the electrical lead line moved downward, now showing the moveable spacer sleeve used to seat the electrical contact below the phantom cell.
FIG. 15 is a vertical cross-sectional view, showing a single cell battery holder with electrical lead wires and contacts as taught herein, for manual use in testing battery cells.

After testing Ni-Cad batteries, it is sometimes found that it is desirable to place an odd number of batteries in a battery pack 20. In such cases, a phantom cell 50 as shown in FIGS. 12, 13, and 14 can be utilized. Ideally, the phantom cell approximates in size one of the cells being removed from the battery pack 20. For heat dissipation, I prefer the use of a fluted design, having multiple flutes F spaced about a central passageway P that allows an extended length lead line 136', for example, to pass therethrough. For increased cooling, a base 300 can be provided to space the phantom cell 50 upward from the battery on which it sets. Also, tubular flanged bushing 302 can be provided for locating electrical contacts, such as contacts 132', below the phantom cell.

It is to be appreciated that the novel battery pack provided by the present invention is a significant improvement in the state of the art of battery packs for use in model aircraft and autos. My novel battery pack, and the method of employing the same in operation of model aircraft and the like, is relatively simple, and it substantially improves the cost effectiveness of the battery operations in apparatus which utilize the same. It will be readily apparent to the reader that my novel, recyclable battery pack device and the method of using the same may be easily adapted to other embodiments incorporating the concepts taught herein. Thus, the invention may be embodied in other specific forms without departing from the spirit or essential characteristics thereof. Therefore, the embodiments presented herein are to be considered in all respects as illustrative and not restrictive. All changes and devices which are described within the meaning and range of equivalents of the claims set forth herein are therefore intended to be embraced therein.

What is claimed is:

1. A battery pack for removeably holding at least one battery cell, said at least one battery cell of the type having (i) an elongate body portion with an outer surface and opposing first and second ends, and (ii) a positive and a negative electrical terminal at opposing first and second ends, said battery pack comprising:
    (a) a bottom end cap, said bottom end cap
        (i) shaped to fit outwardly over said second end of one of said at least one battery cell, and
        (ii) shaped to fit upward along said outer surface of said at least one battery cell, so, as to receive therein in snug fitting fashion, transverse cross-sectionwise, at least some of said outer surface of said elongate body portion of said at least one battery cell,
        (iii) further comprising a first electrical contact, said contact providing electrical continuity to an electrical terminal on said second end of said at least one battery cell;
    (b) a top end cap, said top end cap
        (i) shaped to fit outwardly over said first end of said at least one battery cell, and
        (ii) to fit downward along said outer surface of said at least one battery cell, so as to receive therein in snug fitting fashion, transverse cross-sectionwise, at least some of said outer surface of said elongate body portion of said at least one battery cell,
        (iii) further comprising a second electrical contact, said contact providing electrical continuity to an electrical terminal on said first end of said at least one battery cell;
    (c) one or more tightenable fasteners, said one or more tightenable fasteners adapted to compressively secure said bottom end cap and said top end cap against said first and said second electrical contacts, respectively, of said at least one battery cell.

2. A battery pack for holding a plurality of battery cells, said battery pack comprising:
    (a) a thin wall, generally figure eight shaped battery cell holder sleeve body, said cell holder sleeve body comprising a first and a second tubular segment, each of said tubular segments adapted to receive therein a plurality of generally cylindrical battery cells, said plurality of generally cylindrical battery cells in each of said tubular segments each having a lower end battery cell and an upper end battery cell;
    (b) a bottom end cap, said bottom end cap further comprising a contact bar, said contact bar providing electrical continuity between a lower a lower end battery cell in said first tubular segment and a lower end battery cell in said second tubular segment;

(c) a top end cap, said top end cap further comprising
   (i) an upper inner surface, and
   (ii) a first electrical connector, and
   (iii) a second electrical connector, said first electrical connector and said second electrical connector each further comprising (a) a hollow copper contact and (b) a heavy gauge flexible wire portion, and wherein said hollow copper contact is spaced apart from said upper inner surface by a wave washer; and
(d) a first and second threaded bolt, each of said first and second threaded bolts located spaced apart along opposing central portions of said cell holder body and secured in close fitting relationship through guide passages in each of said upper and lower end caps, and each threaded bolt fastened by a first nut at the upper end of said threaded bolt and located above said upper end cap and by a second nut located below said lower end cap at the lower end of said threaded bolt, and wherein said first and said second threaded bolt are of differing diameter.

3. The battery pack as set forth in claim 2, wherein said first threaded bolt and second threaded bolt are provided in non-interchangeable sizes.

4. The battery pack as set forth in claim 2, wherein said battery cell sleeve body is transparent, so that a user may see said battery cells in said sleeve body.

5. The battery pack as set forth in claim 4, wherein said battery cell sleeve body is lightweight and relatively thin in thickness.

6. The battery pack as set forth in claim 1 or in claim 2, wherein said battery cells are Ni-Cad rechargeable batteries.

7. The battery pack as set forth in claim 2, further comprising a phantom battery portion, said phantom battery portion comprising a substantially annular foam cell portion in a substantially battery shaped configuration, said phantom cell battery portion located at an upper most battery cell location in one of said first or second tubular segments.

8. The battery pack as set forth in claim 7, wherein said phantom battery portion further comprises an annular tubular central portion, said annular tubular central portion adapted to receive therethrough said first electrical connector.

9. A battery pack for holding at least one battery cell, said at least one battery cell of the type having (i) an elongate body portion with an outer surface and opposing first and second ends, and (ii) a positive and a negative electrical terminal at opposing first and second ends, said battery pack comprising:
(a) bottom containment means, said bottom containment means
   (i) shaped to fit outwardly over said second end of one of said at least one battery cell, and
   (ii) shaped to fit upward along said outer surface of said at least one battery cell, so as to receive therein in snug fitting fashion, transverse cross-sectionwise, at least some of said outer surface of said elongate body portion of said at least one battery cell,
   (iii) further comprising a first electrical contact, said contact providing electrical continuity to an electrical terminal on said second end of said at least one battery cell;
(b) a top containment means, said top containment means
   (i) shaped to fit outwardly over said first end of said at least one battery cell, and
   (ii) to fit downward along said outer surface of said at least one battery cell, so as to receive therein in snug fitting fashion, transverse cross-sectionwise, at least some of said outer surface of said elongate body portion of said at least one battery cell,
   (iii) further comprising a second electrical contact, said contact providing electrical continuity to an electrical terminal on said first end of said at least one battery cell; and
(c) tensioning means, said tensioning means adapted to compress said top containment means and said bottom containment means each toward the other, so that each said containment means compressingly engages said at least one battery cell.

10. A battery pack for holding a plurality of battery cells, said battery pack comprising:
(a) a sleeve means, said sleeve means comprising a first and a second tubular segment, each of said tubular segments adapted to receive therein a plurality of generally cylindrical battery cells, said plurality of generally cylindrical battery cells in each of said tubular segments each having a lower end battery cell and an upper end battery cell;
(b) a bottom containment means, said bottom containment means further comprising a contact bar, said contact bar providing electrical continuity between a lower end battery cell in said first tubular segment and a lower end battery cell in said second tubular segment;
(c) a top containment means, said top containment means further comprising
   (i) a first electrical connector, said first electrical connector providing electrical continuity to an upper end battery cell in said first tubular segment, and
   (ii) a second electrical connector, said second electrical connector providing electrical continuity to an upper end battery cell in said second tubular segment;
(d) a tensioning means, said tensioning means adapted to pull said bottom containment means and said top containment means each toward the other, so as to compress vertically adjacent battery cells in each of said first and second tubular segments.

11. The battery pack as set forth in claim 10, wherein said tensioning means comprises a first and a second threaded bolt.

12. The battery pack as set forth in claim 11, wherein said first and said second threaded bolds are provided in non-interchangeable sizes.

13. The battery pack as set forth in claim 10, wherein said sleeve means is transparent, so that a user may see said battery cells held in said sleeve means.

14. The battery pack as set forth in claim 13, wherein said sleeve means is thin in thickness.

15. The battery pack as set forth in claim 9 or in claim 10, wherein said battery cells are Ni-Cad rechargeable batteries.

16. The battery pack as set forth in claim 10, further comprising a phantom battery portion, said phantom battery portion comprising a substantially annular foam cell portion in a substantially battery shaped configuration, said phantom cell battery portion located at an upper most battery cell location in one of said first or second tubular segments.

17. The battery pack as set forth in claim 16, wherein said phantom battery portion further comprises an annular tubular central portion, said annular tubular central portion adapted to receive therethrough said first electrical connector.

* * * * *